United States Patent
Rajewar et al.

(10) Patent No.: US 12,204,480 B2
(45) Date of Patent: Jan. 21, 2025

(54) IDENTIFYING DEVICES WITH MULTIPLE NETWORK INTERFACE CARDS IN A NETWORK

(71) Applicant: Palo Alto Networks, Inc., Santa Clara, CA (US)

(72) Inventors: Rahul Devidas Rajewar, Santa Clara, CA (US); Yilin Zhao, Sunnyvale, CA (US); Gong Cheng, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 108 days.

(21) Appl. No.: 18/297,276

(22) Filed: Apr. 7, 2023

(65) Prior Publication Data
US 2024/0338332 A1    Oct. 10, 2024

(51) Int. Cl.
*G06F 13/14*    (2006.01)
*G06F 13/40*    (2006.01)

(52) U.S. Cl.
CPC ...... *G06F 13/4068* (2013.01); *G06F 2213/40* (2013.01)

(58) Field of Classification Search
None
See application file for complete search history.

(56) References Cited

U.S. PATENT DOCUMENTS

| | | | | |
|---|---|---|---|---|
| 2021/0409316 A1* | 12/2021 | Seshan | ............. | H04L 41/16 |
| 2023/0179839 A1* | 6/2023 | Yin | ............. | G06V 20/47 |
| | | | | 386/278 |
| 2023/0216967 A1* | 7/2023 | Murali | ............. | H04M 15/00 |
| | | | | 455/406 |

* cited by examiner

*Primary Examiner* — Henry Tsai
*Assistant Examiner* — Dean Phan
(74) *Attorney, Agent, or Firm* — Gilliam IP PLLC

(57) ABSTRACT

A service obtains traffic logs for traffic of a network that has been sent according to a Layer 7 protocol (e.g., SNMP or DNS). The service identifies from the traffic logs device names that appear to correspond to different devices/NICs as names of candidate multi-NIC devices. The service extracts features from names of the candidate multi-NIC devices and generates respective feature vectors. The service can generate "documents" representing each device name from which it extracts features by determining n-grams of each device name, where a set of n-grams of a device name is treated as a document, and each n-gram is treated as a term in the document. Exemplary features that can be extracted based on a device name document include within-document and cross-document uniqueness scores. The service clusters the feature vectors with unsupervised learning and identifies clusters of a size that satisfies a criterion as corresponding to multi-NIC devices.

20 Claims, 7 Drawing Sheets

IDENTIFYING DEVICES WITH MULTIPLE NETWORK INTERFACE CARDS IN A NETWORK

BACKGROUND

The disclosure generally relates to transmission of digital information (e.g., CPC subclass H04L) and to arrangements for maintenance, administration, or management of data switching networks (e.g., CPC subclass H04L 41/00).

Network interface cards (NICs), sometimes also referred to as network interface controllers (among other terms), are hardware components of devices that allow devices to connect to a network. NICs are assigned unique media access control (MAC) addresses for addressing in network layer communications. NICs may be wired or wireless. A wired NIC comprises a port by which cabling (e.g., Ethernet cabling) can be connected to a device to establish a wired network connection. A wireless NIC generally comprises an antenna via which a device can establish a wireless network connection (e.g., to a Wi-Fi® network). Some devices, such as routers and other network devices, comprise multiple NICs, each of which has assigned its own MAC address.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Overview

Networking products and services may offer device inventory services. Device inventory services are utilized to determine the devices in a network that have a NIC(s). Devices with multiple NICs ("multi-NIC devices") can present a challenge, however. Solutions that take device inventory on a per-NIC basis can yield false device counts and unclear device identities due to multi-NIC devices being counted once per each NIC, among other issues.

Multi-NIC devices in a network can be identified and counted without duplication as described herein. A multi-NIC device identification service obtains traffic logs for traffic of a network that has been sent according to a Layer 7 protocol, which may be Simple Network Management Protocol (SNMP) or Domain Name System (DNS). Generally, device names identifiable from the traffic logs (e.g., SNMP system names or DNS hostnames) that appear to correspond to unique devices/NICs are candidates for being multi-NIC devices; however, model or default names may be shared across devices, so using device names alone to identify which of the devices have multiple NICs may be unreliable due to the potential for false positives. To facilitate identification of unique device names that correspond to one device with multiple NICs rather than multiple instances of the same device model, the disclosed service extracts features from the names of the candidate multi-NIC devices and generates respective feature vectors therefrom. The service generates "documents" representing the device name from which it can extract features by determining n-grams of each device name, where a set of n-grams determined for a device name is treated as a document, and each n-gram is treated as a term in the document. The service clusters the feature vectors with unsupervised learning (e.g., using k-means or hierarchical clustering). Clusters of a size that satisfies a criterion, such as being below a threshold, can then be identified as corresponding to multi-NIC devices, with each cluster member representing a NIC of the device.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Illustrations

Figure 1:
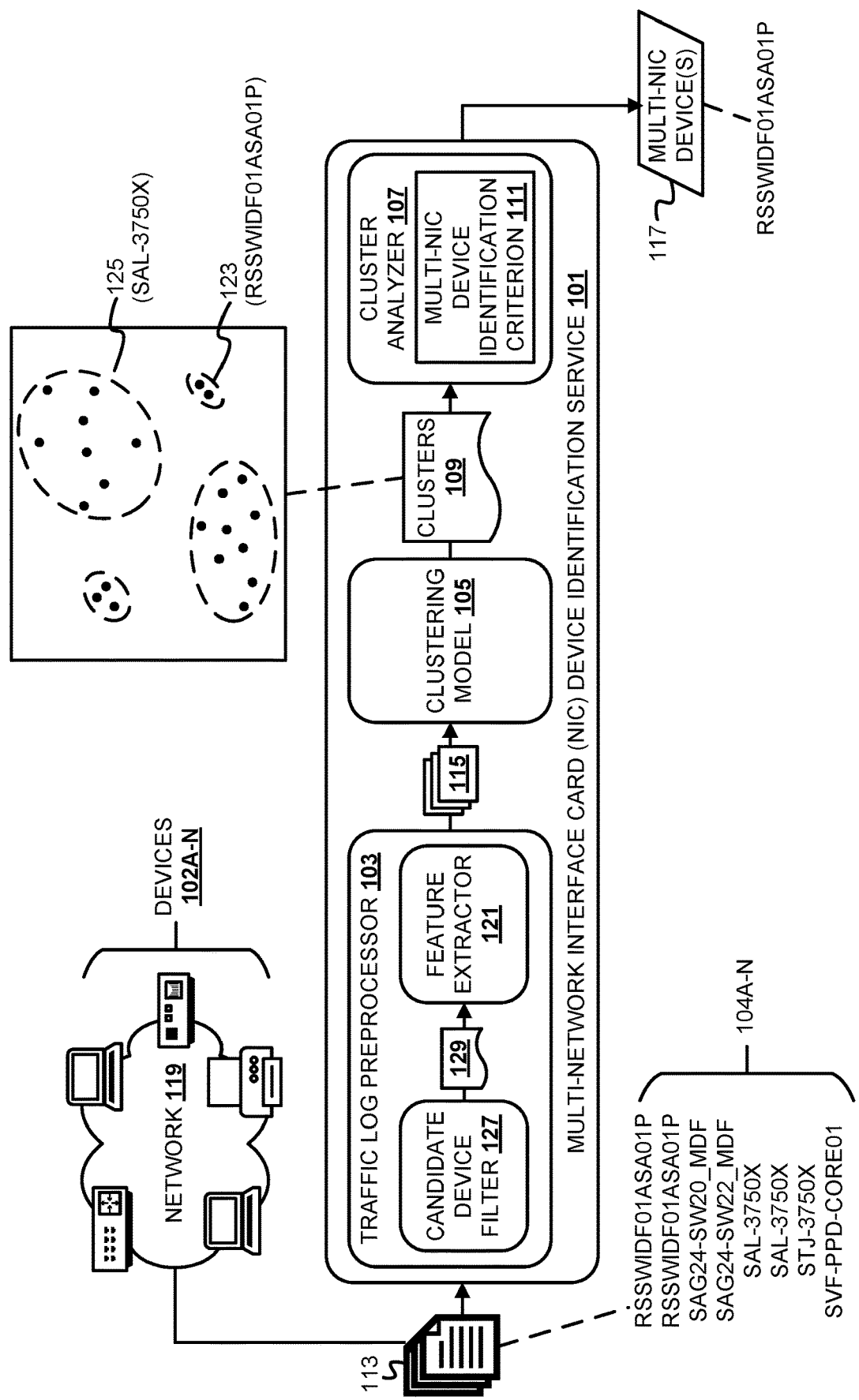
FIG. 1 is a conceptual diagram of identifying multi-NIC devices in a network.

FIG. 1 is a conceptual diagram of identifying multi-NIC devices in a network. A plurality of devices 102A-N are connected to a network 119 (which may be a local area network (LAN), wide area network (WAN), etc.). The devices 102A-N are any devices having one or more wired and/or wireless NICs, such as network devices (e.g., routers), Internet of things (IoT) devices, computers, and the like. FIG. 1 also depicts a multi-NIC device identification service ("the service") 101. The service 101 comprises a traffic log preprocessor 103, a clustering model 105, and a cluster analyzer 107. The service 101 may execute on a physical or virtual device/system (e.g., on a physical or cloud server) and can communicate with one or more entities connected to the network 119, which may include the devices 102A-N, to periodically collect traffic logs generated for layer 7 network traffic, such as SNMP or DNS traffic. For instance, the service 101 may comprise an SNMP manager or may communicate with an SNMP manager that communicates with the devices 102A-N of the network 119. The communication by the service 101 to collect traffic logs may be via agents or other client-side software installed on the devices 102A-N (e.g., SNMP agents).

In this example, the service 101 collects traffic logs 113 from the devices 102A-N. Collection of the traffic logs 113 may be based on a schedule, based on a trigger condition being met, etc. The traffic logs 113 in this example comprise SNMP logs. The traffic logs 113 indicate SNMP traffic of the network 119 at least since a prior SNMP log collection event. The traffic logs 113 indicate devices names 104A-N, which are SNMP system names in this example, corresponding to the devices 102A-N. Multiple instances of the same device name can correspond to different NICs of a device that has multiple NICs or different devices that share a device name, such as a default or model name.

A candidate device filter 127 of the traffic log preprocessor 103 identifies the device names 104A-N from the traffic logs 113 and filters the device names 104A-N to determine candidate multi-NIC device names ("candidate device names") 129. Candidate multi-NIC devices are those having device names (e.g., SNMP system names or DNS hostnames) that appear to correspond to a unique NIC, such as device names that are associated with multiple different addresses (e.g., MAC addresses) or other identifiers in the traffic logs 113. The candidate device filter 127 can determine unique pairs of device names and addresses/identifiers from the traffic logs 113 (e.g., by identifying each pair represented in the traffic logs 113 and deduplicating the pairs) to filter the candidate device names 129 from the device names 104A-N. The candidate device names 129 comprise at least a subset of the device names 104A-N that result from this filtering based on examination of the traffic logs 113. A feature extractor 121 of the traffic log preprocessor 103 then generates feature vectors 115 for the candidate device names 129 based on extracting features therefrom. In this example, the DNS system names SAL-3750X and RSSWIDF01ASA01P are represented multiple times in the device names 104A-N and are thus filtered out by the candidate device filter 127 as candidate multi-NIC device names.

To extract features from a device name, the feature extractor 121 generates a representative document for the device name that comprises n-grams of the device name. For each device name of the candidate device names 129, the feature extractor generates a document by determining n-grams of the device name (e.g., trigrams). The feature extractor 121 then determines within-document and cross-document uniqueness scores for the device name based on the corresponding document. Exemplary within-document uniqueness scores that can be determined include term frequency (TF) scores and/or entropy values computed based on the document. Exemplary cross-document uniqueness scores that can be determined include inverse document frequency (IDF) scores and/or cosine similarities. To determine the scores for each of the candidate device names 129, the feature extractor 121 can treat each individual n-gram within its respective document as a term. In other words, the collection of documents used for scoring comprises the set of documents generated for the candidate device names 129, where each of the documents comprises a plurality of terms that correspond to an n-gram of the respective device name. As the feature extractor 121 determines the scores for each of the candidate device names 129, the feature extractor 121 generates a corresponding one of the feature vectors 115. The feature vectors 115 at least comprise these scores determined for the respective ones of the candidate device names 129. The feature extractor 121 can associate with each of the feature vectors 115 the corresponding one of the candidate device names 129 (e.g., via labelling, tagging, or otherwise attaching the device name to the feature vector). Feature vector generation based on device names is depicted in further detail in FIG. 2.

The traffic log preprocessor 103 inputs the feature vectors 115 into the clustering model 105 for clustering. The clustering model 105 utilizes unsupervised learning to cluster feature vectors representing device names into clusters. For instance, the clustering model 105 may cluster feature vectors using k-means clustering or hierarchical clustering. For the k-means clustering, the service 101 may determine the value of k for clustering into k clusters using the elbow method. The clustering model 105 may have been preconfigured to ignore/disregard a label, tag, etc. that indicates the device name to which each of the feature vectors 115 corresponds. The clustering model 105 clusters the feature vectors 115 into a plurality of clusters and outputs cluster data 109. The cluster data 109 comprise indications of cluster memberships for the feature vectors 115 and their corresponding device names.

The cluster analyzer 107 obtains and analyzes the cluster data 109 based on a multi-NIC device identification criterion ("the criterion") 111. The criterion 111 indicates a criterion for classifying devices as multi-NIC devices based on analysis of clustered feature vectors representing device names. The criterion 111 can comprise a cluster size threshold against which sizes of the clusters indicated in the cluster data 109 are evaluated; clusters having a size below the cluster size threshold are determined to satisfy the criterion 111. As an example, the criterion 111 may indicate a cluster size threshold of three such that clusters having a size of three or less satisfy the criterion 111. If the cluster analyzer 107 determines that a cluster represented in the cluster data 109 satisfies the criterion 111, the cluster analyzer 107 predicts that the cluster corresponds to a multi-NIC device, and the feature vectors within that cluster thus are considered to represent a different NIC of the corresponding device. The cluster analyzer 107 records indications of the clusters that satisfy the criterion 111 (if any) and determines the corresponding one(s) of the devices 102A-N to which the cluster(s) corresponds (e.g., based on the label, tag, etc. indicating the device name that is associated with the feature vectors in the respective cluster).

Assuming that one or more clusters satisfied the criterion 111, the service 101 indicates a set of one or more multi-NIC devices ("the multi-NIC device set") 117 that comprise indications of those of the devices 102A-N determined to correspond to a cluster that satisfied the criterion 111 (e.g., device names, addresses, numbers of NICs predicted based on cluster sizes, etc.). The service 101 may, for instance, generate a report or notification that indicates the multi-NIC device set 117, insert an indication of the multi-NIC device set 117 into a database or other data store for subsequent access, etc.

With reference to FIG. 1, the cluster data 109 indicate two exemplary clusters: a cluster 123, which corresponds to the DNS system name RSSWIDF01ASA01P, and a cluster 125, which corresponds to the DNS system name SAL-3750X. The cluster 123 and cluster 125 are depicted as having sizes of two and eight, respectively. For an exemplary size threshold of three given by the criterion 111, the cluster analyzer 107 determines that the cluster 123 satisfies the criterion 111 due to its size being below the size threshold and thus predicts that the system name RSSWIDF01ASA01P corresponds to a multi-NIC device having two NICs. The service 101 indicates the system name RSSWIDF01ASA01P in the multi-NIC device set 117. The size of the cluster 125, however, exceeds the size threshold given by the criterion 111 and is determined to not correspond to a multi-NIC device; instead, the system name SAL-3750X may be a default system name (e.g., a model name) shared across multiple devices having a single NIC. Feature extraction and clustering for candidate multi-NIC devices after identifying candidate multi-NIC devices from device names alone thus can filter out false positives.

Figure 2:
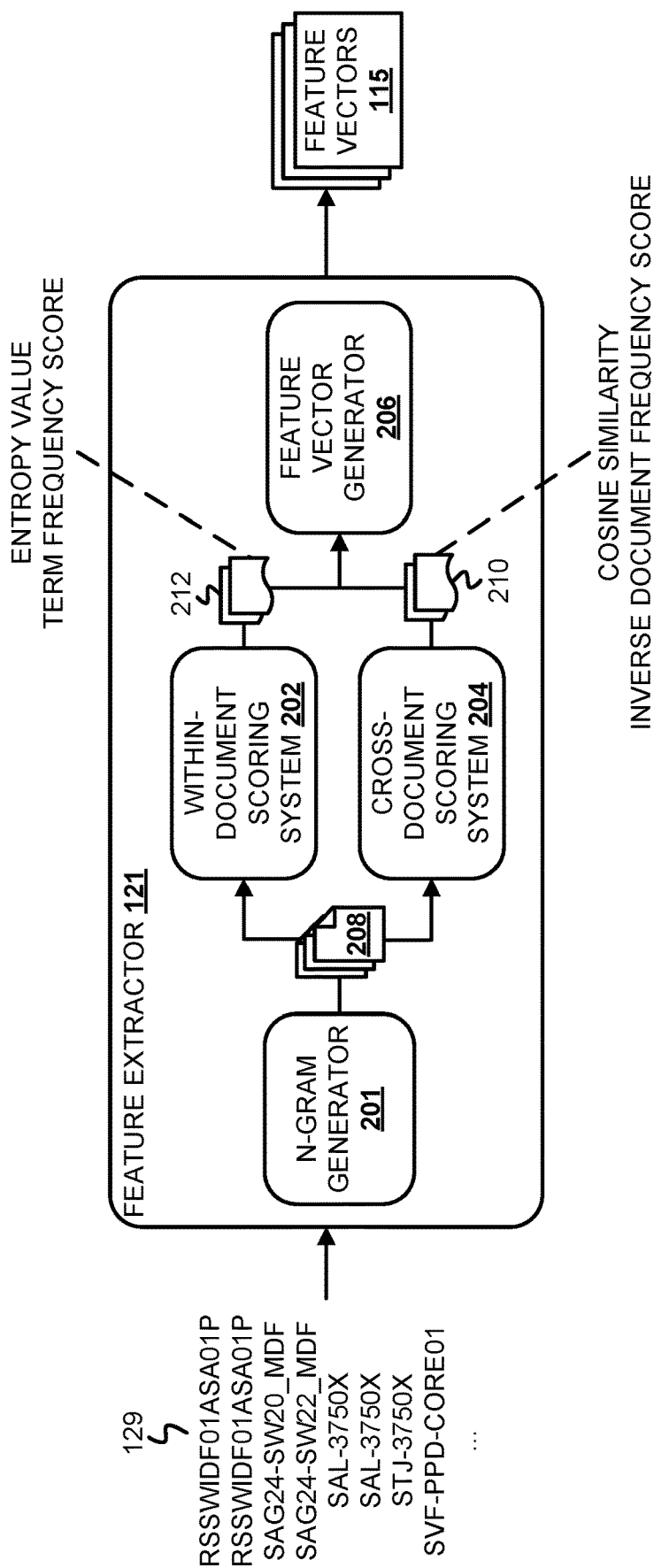
FIG. 2 is a conceptual diagram of extracting features from device names as part of feature vector generation.

FIG. 2 is a conceptual diagram of extracting features from device names as part of feature vector generation. FIG. 2 depicts extraction of features from the candidate device names 129 by the feature extractor 121 in additional detail. The feature extractor 121 obtains the candidate device names 129. For each device name, an n-gram generator 201 generates n-grams of the device name. The value of n may be preconfigured for the n-gram generator 201 or provided as a parameter value. For instance, the n-gram generator 201 may be preconfigured such that n has a value of three and the n-gram generator 201 generates trigrams of each device name. Generation of n-grams of the candidate device names 129 yields a set of documents 208, where each of the documents 208 comprises n-grams of a respective one of the candidate device names 129. To illustrate, for the candidate device name RSSWIDF01ASA01P when n=3, the corresponding one of the documents 208 generated by the n-gram generator 201 comprises the trigrams "RSS", "SSW", "SWI", "WID", etc. The n-gram generator 201 may be preconfigured to represent the start and/or end of each device name with a designated character (e.g., a space, "#", "_", etc.).

The feature extractor 121 comprises a within-document scoring system 202 ("the scoring system 202") and a cross-document scoring system 204 ("the scoring system 204"). The scoring system 202 and the scoring system 204 determine scores based on the documents 208 indicative of uniqueness of the corresponding candidate device names 129. Uniqueness of a candidate device name as quantified by the scoring systems 202, 204 is indicative that multiple instances of the device name correspond to multiple NICs of an individual device rather than separate devices that have one respective NIC.

The scoring system 202 determines one or more within-document scores for each of the documents 208 and respective candidate device names 129. Within-document scores determined by the scoring system 202 can include entropy (e.g., information entropy) and/or TF scores. The scoring system 202 determines the TF score and/or entropy for each of the candidate device names 129 based on the corresponding one of the documents 208, where each n-gram included in a document is treated as a term. For TF score determination, the scoring system 202 can determine a TF score of each term in a document and aggregate (e.g., average) the TF scores of each of the terms to yield an aggregate TF score for a device name. For entropy determination, the scoring system 202 can determine an estimated Shannon entropy, for example, of a device name. The result of score determination for each of the documents 208 by the scoring system 202 yields within-document scores 212, which comprise an entropy value and aggregate TF score for each of the candidate device names 129 in this example.

The scoring system 204 determines one or more cross-document uniqueness scores for each of the documents 208 and respective candidate device names 129. Cross-document uniqueness scores determined by the scoring system 204 can include cosine similarities and/or IDF scores. The scoring system 204 determines a cosine similarity and/or IDF score for each of the candidate device names 129 based on the set of documents 208. For determining cosine similarity for each of the documents 208, the scoring system 204 can determine a cosine similarity of the document compared to others of the documents 208 to yield a plurality of cosine similarities. For determining an IDF score for one of the candidate device names 129 based on a corresponding one of the documents 208, the scoring system 204 may determine an IDF score for each term in the document based on the others of the documents 208, where each n-gram in the document is again treated as a term. The scoring system 204 may then aggregate the IDF scores determined for each term in the document such that the IDF score of a device name based on its n-grams document is an aggregate IDF score that accounts for each of the n-grams. The result of score determination for each of the documents 208 by the scoring system 204 yields cross-document scores 210, which comprise a set of cosine similarities and an aggregate IDF score for each of the candidate device names 129 in this example.

A feature vector generator 206 generates the feature vectors 115 based on the cross-document scores 210 and the within-document scores 212. For each of the candidate device names 129 and respective ones of the cross-document scores 210 and within-document scores 212, the feature vector generator 206 generates a feature vector that comprises the cross-document similarity score(s) and the within-document similarity score(s) determined for the device name. The feature vector generator 206 may further label, tag, or otherwise attach an indication of the device name to the generated feature vector to maintain an association between each feature vector and the device name to which it corresponds during clustering operations. The feature vectors 115 that result can then be supplied as input to a clustering model as described in reference to FIG. 1.

FIGS. 3-6 are flowcharts of example operations pertaining to identifying multi-NIC devices in a network. The example operations are described with reference to a multi-NIC device identification service (hereinafter simply "the service") for consistency with the earlier Figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 3:
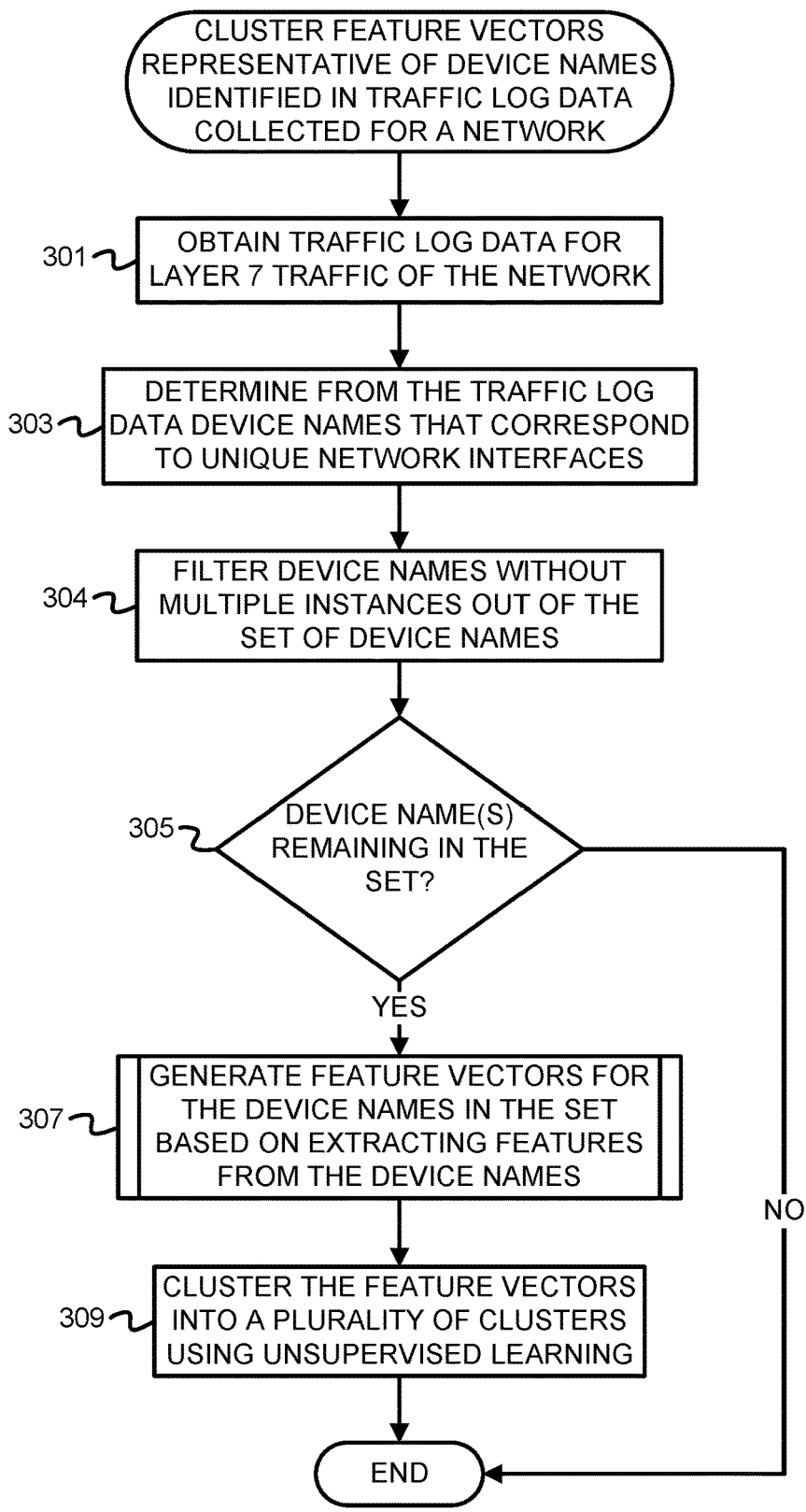
FIG. 3 is a flowchart of example operations for clustering feature vectors representative of device names identified in traffic log data collected for a network.

FIG. 3 is a flowchart of example operations for clustering feature vectors representative of device names identified in traffic log data collected for a network. At block 301, the service obtains traffic log data for Layer 7 traffic of the network. The Layer 7 network traffic may be SNMP traffic or DNS traffic, for example. The service can obtain the traffic log data from an entity of the network that has logged the Layer 7 network traffic. For instance, the service may obtain SNMP traffic log data from an SNMP manager of the network or may obtain DNS traffic from a DNS server of the network. As another example, the service may obtain the SNMP traffic log data from devices connected to the network directly (e.g., via communication with SNMP agents installed on the devices). Traffic log data may be obtained periodically, such as according to a schedule, based on satisfaction of a trigger condition (e.g., detection of a new device(s) connected to the network), based on receipt of an instruction/command, etc.

At block 303, the service determines from the traffic log data device names that correspond to unique network interfaces. What is considered a device name can vary depending on the Layer 7 protocol for which logged traffic is being analyzed, though a device name is generally a higher-layer (i.e., relative to Layer 2 or 3 addresses) name by which a device that is a source and/or destination of traffic can be identified in traffic log data. Device names for SNMP may be SNMP OIDs or system/symbolic names, while device names for DNS may be DNS hostnames. The service can determine these device names by determining pairs between device names and addresses that are identifiable from the traffic log data and deduplicating the pairs of device names and addresses or other unique identifiers (e.g., network addresses). The deduplicated pairs comprising device names may be stored in a list or other data structure. Addresses/unique identifiers can be used in conjunction with device names to account for device names that have multiple unique occurrences (i.e., in association with different NICs). The deduplicated list or other data structure comprising device names, hereinafter referred to as the set of device names, should represent unique NICs associated with devices that are connected to the network.

At block 304, the service filters device names without multiple instances out of the set of device names. Device names without multiple instances in the set of device names are representative of single-NIC devices and thus are not candidates for identification as multi-NIC devices. Filtering device names out of the set can include discarding single-instance device names, distinguishing single-instance device names from other device names in the set (e.g., based on flagging/marking single-instance device names), etc.

At block 305, the service determines if one or more device names are remaining in the set. Any remaining device names are associated with multiple NICs and thus are associated with multi-NIC device candidates. If the set indicates one or more device names (i.e., is not empty, has a nonzero length, etc.), operations continue at block 307. If no device names are remaining in the set after filtering out those with single unique instances, there are no candidate multi-NIC devices currently in the network, and operations are complete.

At block 307, the service generates feature vectors for the device names in the set based on extracting features from the device names. For each of the device names, the service generates a respective feature vector comprising features extracted from the device name. Feature extraction from device names for generation of corresponding feature vectors is described in further detail in reference to FIG. 4.

At block 309, the service clusters the feature vectors into a plurality of clusters using unsupervised learning. The service uses a clustering algorithm, such as k-means clustering or hierarchical clustering, to cluster the feature vectors into a plurality of clusters. For k-means clustering, the service may select the value of k using the elbow method or may have been preconfigured with the value of k. The service makes the resulting data that indicate clusters of feature vectors available for further analysis, which will be described in reference to FIG. 6. For instance, the service may store the data in a database or other data store.

Figure 4:
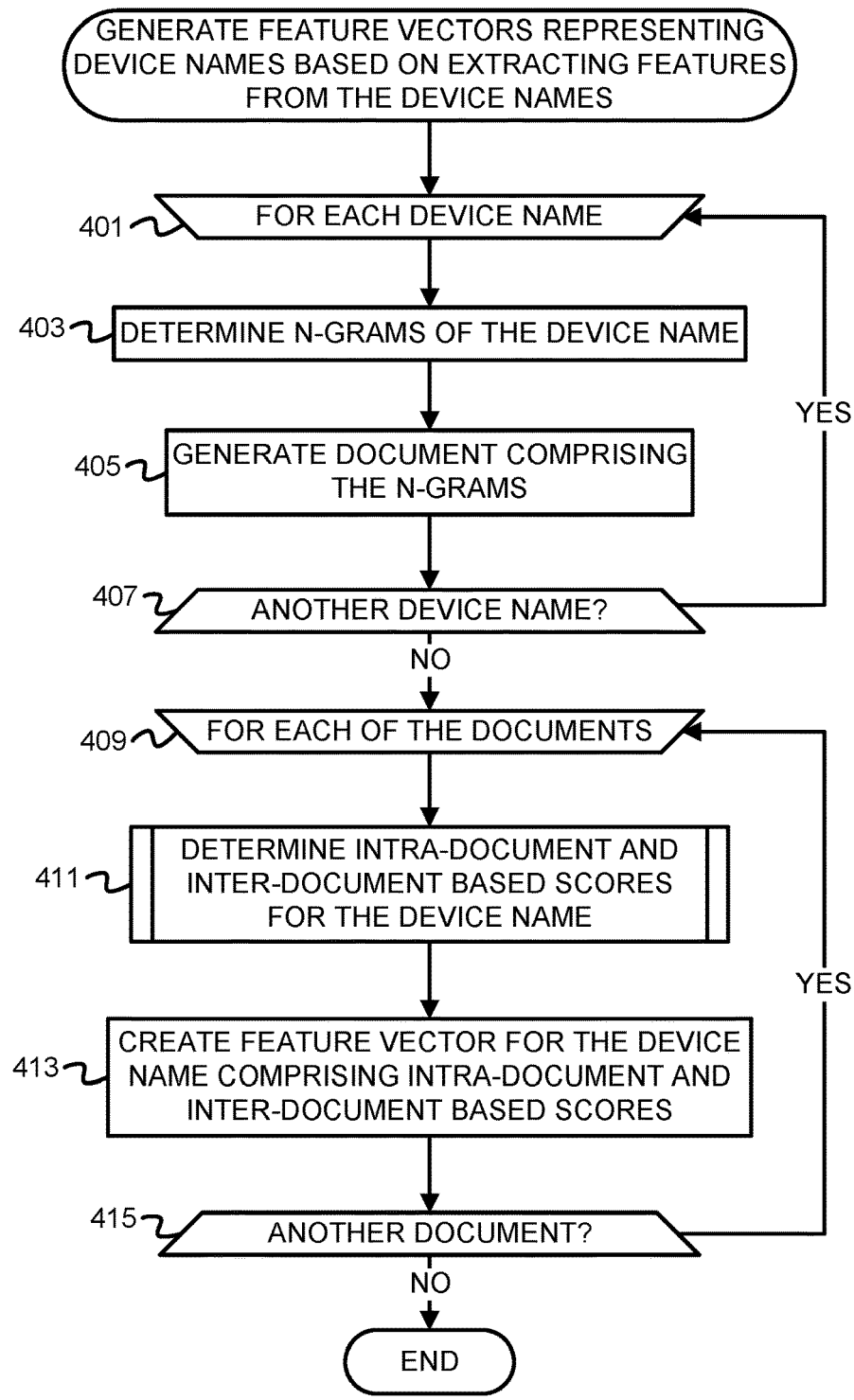
FIG. 4 is a flowchart of example operations for generating feature vectors representing device names based on extracting features from the device names.

FIG. 4 is a flowchart of example operations for generating feature vectors representing device names based on extracting features from the device names. The example operations assume that the service has already determined a set of names of devices of a network based on traffic log data collected for the network. The device names may have previously been determined to correspond to candidate multi-NIC devices based on having multiple unique representations as an endpoint for network communications in the traffic log data. The multiple unique representations may correspond to multiple unique devices or multiple NICs that are part of a same device. At block 401, the service begins iterating over each device name in the set.

At block 403, the service determines n-grams of the device name. The value of n may be preconfigured or indicated as a parameter value provided with input into the service. As an example, the value of n may be three such that the service determines trigrams of the device name. The service may include leading and/or trailing characters in the n-grams to account for variability in lengths of device names (e.g., "##e", "#ex", "exa", . . . , "ple", "le#", "e##" for trigrams of "example").

At block 405, the service generates a document comprising the n-grams. The document may be in the form of a file (e.g., a text file) to which the service writes the n-grams or a data structure in which the service stores the n-grams. For instance, the service may create an array and store each n-gram of the device name in a respective element of the array.

At block 407, the service determines if there is another device name in the set. If there is another device name, operations continue at block 401. Otherwise, operations continue at block 409, where the service begins iterating over each of the documents.

At block 411, the service determines intra-document based scores and inter-document based scores for the device name. The service determines one or more intra-document based scores from the n-grams of the document and one or more inter-document based scores from n-grams of the document and n-grams of the other documents in the collection of documents. Intra- and inter-document based scores are scores that can be used to aid in distinguishing unique device names that correspond to a single device having multiple interfaces from multiple devices having a same name, which may be a model name or default name, for instance. Intra-document based scores (also referred to above as "within-document based scores") may include information entropy and/or TF scores and are determined based on n-grams of a device name within the document corresponding to the device name. Inter-document based scores (also referred to above as "cross-document based scores") may include IDF scores and/or cosine similarities and are determined based on n-grams across the collection documents. For score calculation, the service can treat each n-gram as a term in its corresponding document. Determining intra-document and inter-document based scores for a device name is described in further detail in reference to FIG. 5.

At block 413, the service creates a feature vector for the device name comprising the intra-document based score(s) and the inter-document based score(s). Each score is stored in a respective element of the feature vector. The service may further associate the device name with the feature vector, such as through labelling, tagging, or other means of attachment.

At block 415, the service determines if another document is remaining. If there is another document remaining, operations continue at block 409. If there are no other documents remaining, operations are complete.

Figure 5:
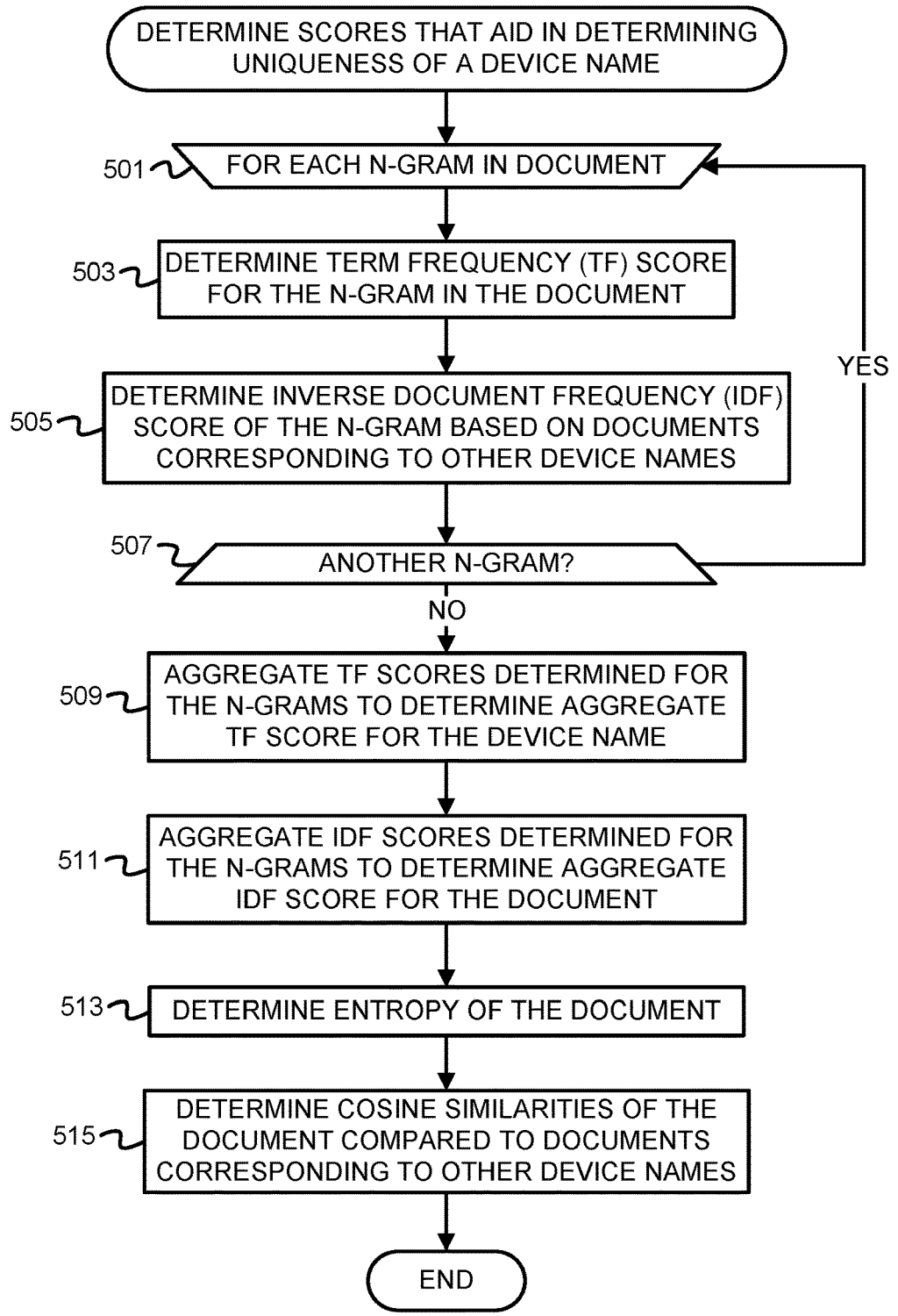
FIG. 5 is a flowchart of example operations for determining scores that aid in determining uniqueness of a device name.

FIG. 5 is a flowchart of example operations for scores that aid in determining uniqueness of a device name. The example operations assume that a collection of documents comprising device name n-grams has been generated, where each of the documents in the collection comprises n-grams of a corresponding device name. The determined scores include intra-document scores, or scores determined based on n-grams of a device name included in its respective document, or inter-document scores, or scores determined for a device name based on its n-grams and n-grams included in documents across device names. The service may generate a feature vector from the resulting scores once the set of scores has been determined or may add the scores to the feature vector at a respective index as the scores are determined.

At block 501, the service begins iterating over each n-gram in a document generated for the device name. For score calculation, the service can treat each n-gram as a term in its corresponding document.

At block 503, the service determines a TF score for the n-gram in the document. The service computes the TF score for the n-gram according to the TF formula. In implementations, the service may utilize the raw TF score or may weight/adjust the TF score.

At block 505, the service determines an IDF score for the n-gram based on the collection of documents corresponding to device names. The service computes the IDF score according to the IDF formula. In implementations, the service may utilize the raw IDF score or may weight/scale the IDF score.

At block 507, the service determines if there is another n-gram in the document. If there is another n-gram, operations continue at block 501. Otherwise, operations continue at block 509.

At block 509, the service aggregates the TF scores determined for the n-grams of the device name to determine an aggregate TF score for the device name. The service aggregates the TF scores determined for each n-gram of the device name to result in an aggregate TF score for the device name. Aggregation of the TF scores may be achieved through averaging, adding, etc.

At block 511, the service aggregates the IDF scores determined for the n-grams of the device name to determine an aggregate IDF score for the device name. The service aggregates the IDF scores determined for each n-gram of the device name to result in an aggregate IDF score for the device name. Aggregation of the IDF scores may be achieved through averaging, adding, etc.

At block 513, the service determines entropy of the document. The service can determine or estimate information entropy of the document based on the formula for Shannon entropy, for example. Entropy may be determined/estimated based on each individual character in the document. As another example, the service may determine an entropy estimate for each n-gram and aggregate the entropy values to yield an aggregate entropy estimate.

At block 515, the service determines cosine similarities of the document compared to documents corresponding to other device names. The service determines a cosine similarity between the document and each of the other documents in the collection, which yields a plurality of cosine similarities that each indicate similarity between the document and a corresponding one of the other documents. The service may utilize an off-the-shelf or open-source program for determination of cosine similarities. The service may maintain cosine similarities in a particular order that is preserved for feature vector generation. Additionally, the service may assign a default cosine similarity such as a cosine similarity of 1 to an instant document compared to itself. As an illustrative example, if the cosine similarity between the instant document and a document X is stored in the Nth index of each feature vector, the value of the Nth index of the feature vector representing document X should be 1 (or another default similarity value being used).

Figure 6:
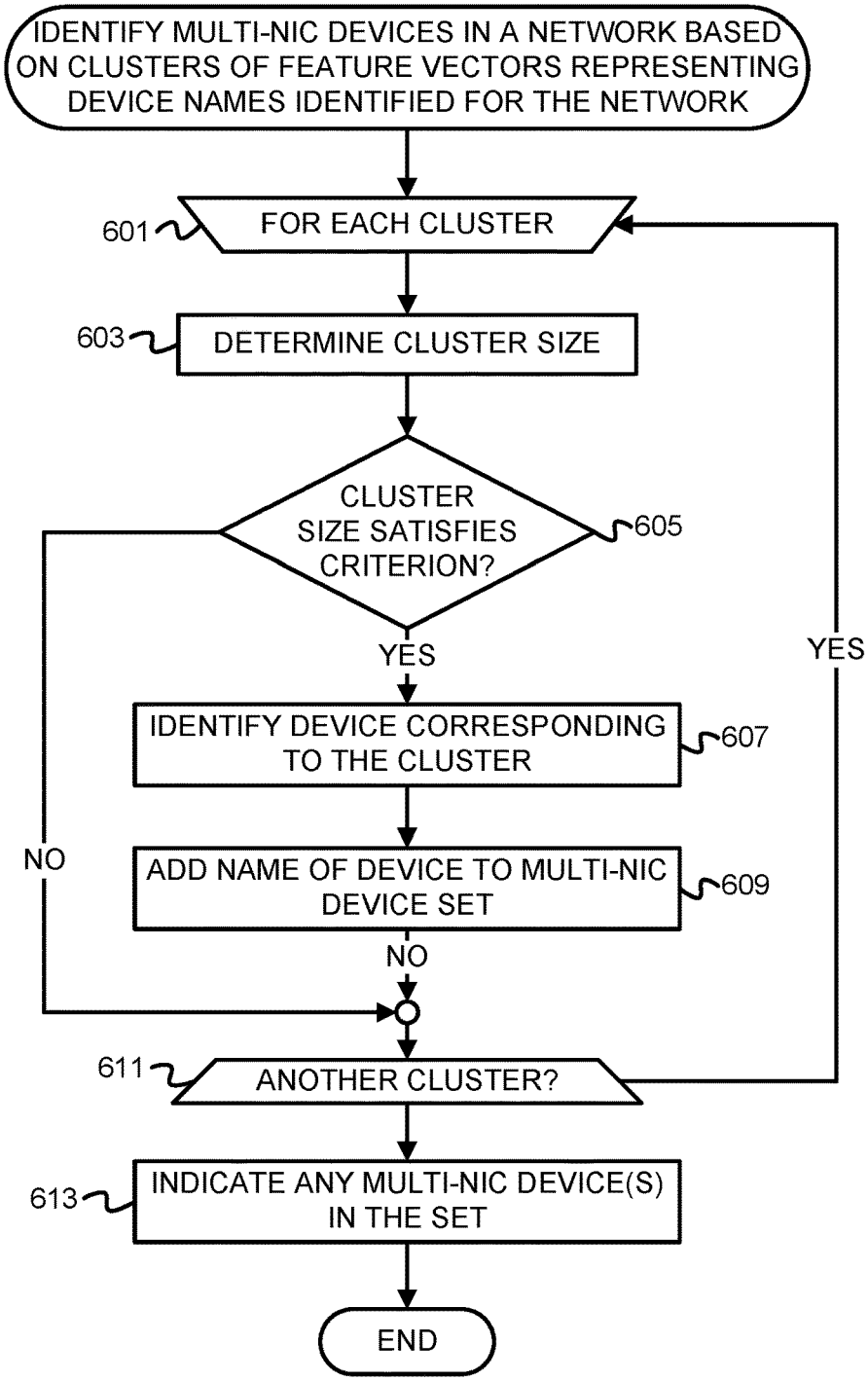
FIG. 6 is a flowchart of example operations for identifying multi-NIC devices in a network based on clusters of feature vectors representing device names identified for the network.

FIG. 6 is a flowchart of example operations for identifying multi-NIC devices in a network based on clusters of feature vectors representing device names identified for the network. The example operations assume that the feature vectors have been clustered using unsupervised learning and the service has access to data indicating cluster membership among the feature vectors.

At block 601, the service begins iterating over data corresponding to each cluster. At block 603, the service determines a size of the cluster. The size of the cluster refers to a count of feature vectors belonging to the cluster (i.e., cluster membership size). The size may be indicated directly in the cluster data or may be determined based on counting the number of feature vectors indicated as belonging to the cluster.

At block 605, the service determines if the cluster size satisfies a criterion. The service maintains at least a first criterion that clusters should satisfy to yield a determination that the cluster represents a multi-NIC device. The cluster may comprise a threshold representing a cluster size considered a maximum size that could correspond to a multi-NIC device, where this size may have been tuned and selected based on expert knowledge and/or prior testing. A cluster having a size satisfying the threshold (e.g., by being less than the threshold value for an exclusive threshold or less than/equal to the threshold value for an inclusive threshold) is determined as corresponding to a multi-NIC device. As an example, clusters having a size less than five are determined to correspond to a multi-NIC device if the criterion indicates a threshold of five. Clusters having a size that satisfies the criterion are considered to represent multi-NIC devices, where a cluster size corresponds to a predicted number of NICs of the corresponding device. Clusters having a size that does not satisfy the criterion (e.g., due to exceeding the threshold) may represent groups of devices that are associated with the same or similar model name, factory name, etc. The service evaluates the cluster size against the threshold to determine if the cluster size satisfies the threshold and thus satisfies the criterion. If the cluster size satisfies the criterion, operations continue at block 607. If the cluster size does not satisfy the criterion, operations continue at block 611.

At block 607, the service identifies the device corresponding to the cluster. If device names were associated with feature vectors before clustering (e.g., based on labelling or tagging), the service can identify the device name associated with the feature vectors in the cluster based on the label, tag, etc. associated therewith.

At block 609, the service adds the device name to a set of multi-NIC devices. The service may add the device name to the set by adding the device name to a data structure (e.g., a list) or writing the device name to a file. The service may also associate an indication of the cluster size with the device name. As an example, if a cluster having a size of three was identified as corresponding to a device named "HOSTNAME_SYSTEM_1", the service adds the name "HOSTNAME_SYSTEM_1" and a corresponding indication of the size of three to the set. The cluster size reflects a predicted number of NICs of the device.

At block 611, the service determines if there is another cluster to be evaluated. If there is another cluster, operations continue at block 601. Otherwise, operations continue at block 613.

At block 613, the service indicates the multi-NIC device (s) in the set (if any). Assuming the set indicates one or more devices, the service may generate a report or notification indicating the multi-NIC device(s), store the set of multi-NIC devices for subsequent access, etc.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
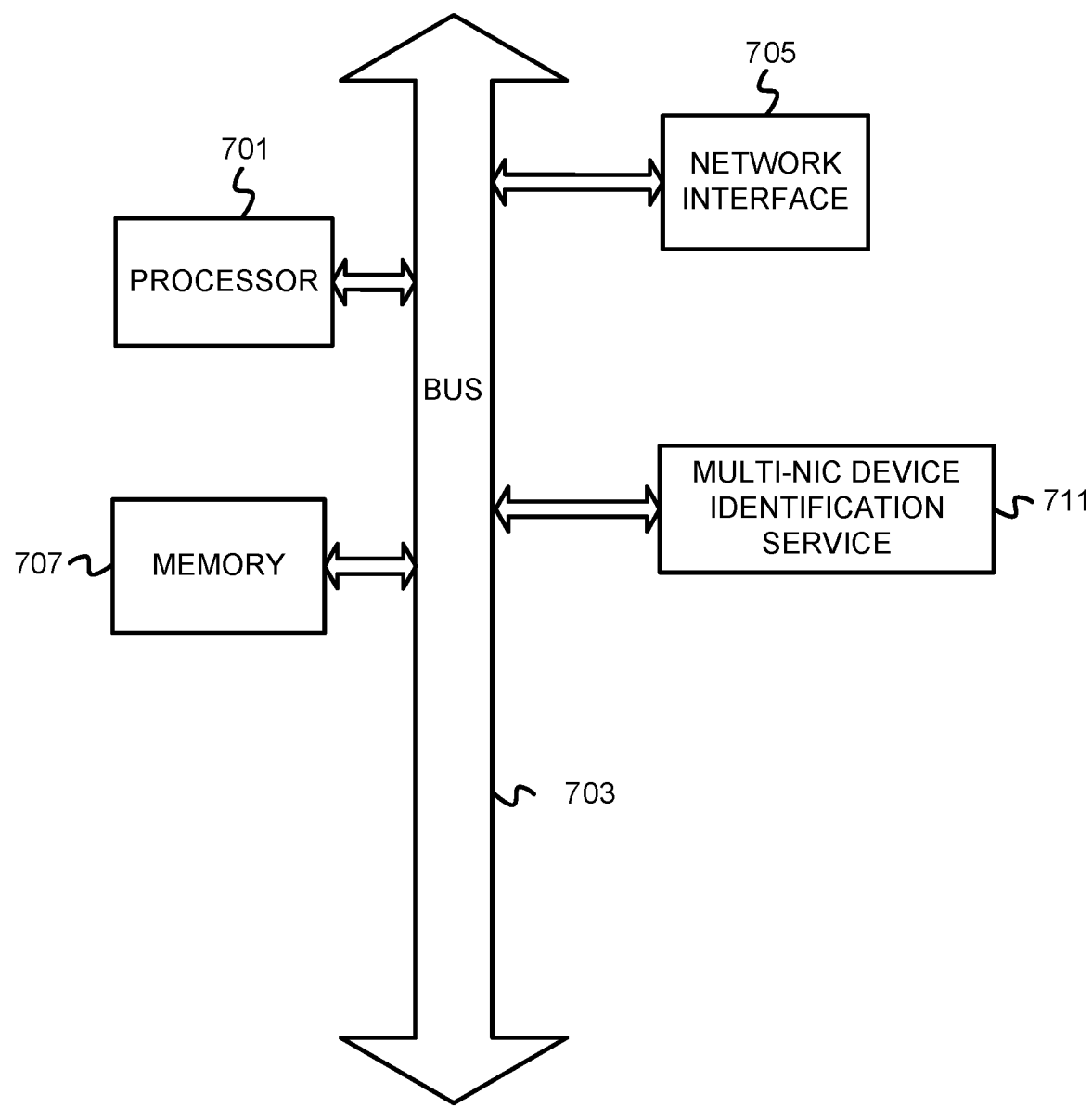
FIG. 7 depicts an example computer system with a multi-NIC device identification service.

FIG. 7 depicts an example computer system with a multi-NIC device identification service. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes multi-NIC device identification service 711. The multi-NIC device identification service 711 identifies based on traffic logs of a network names of devices of the network that correspond to candidate multi-NIC devices, extracts features from the device names to generate representative feature vectors, and clusters the feature vectors. The multi-NIC device identification service 711 analyzes the clusters based on a criterion for multi-NIC device identification and, for those that satisfy the criterion, identify the corresponding device and indicate that the device is predicted to be a multi-NIC device. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

The invention claimed is:

1. A method comprising:
    identifying a plurality of device names corresponding to a plurality of devices from traffic logs generated for a network;
    based on extracting features from each of the plurality of device names, generating a plurality of feature vectors, wherein each of the plurality of feature vectors comprises features extracted from a corresponding one of the plurality of device names;
    clustering the plurality of feature vectors into a plurality of clusters;
    determining if any of the plurality of clusters satisfy a size criterion; and
    based on determining that a first cluster of the plurality of clusters satisfies the size criterion, identifying the first cluster as corresponding to a multi-network interface card (NIC) device.

2. The method of claim 1, wherein determining if any of the plurality of clusters satisfy the size criterion comprises determining if any of the plurality of clusters have a size that is below a size threshold, and wherein determining that the first cluster satisfies the size threshold comprises determining that a size of the first cluster is below the size threshold.

3. The method of claim 1 further comprising identifying one of the plurality of devices that corresponds to the first cluster and indicating that the one of the plurality of devices is a multi-NIC device.

4. The method of claim 1 further comprising generating a plurality of documents for the plurality of device names, wherein generating each of the plurality of documents comprises generating n-grams of a corresponding one of the plurality of device names.

5. The method of claim 4,
    wherein extracting the features from each of the plurality of device names comprises determining, for each of the plurality of documents and corresponding one of the plurality of device names, at least one of one or more within-document uniqueness scores based on the n-grams of the device name and one or more cross-document uniqueness scores based on the n-grams of the device name, and wherein generating the plurality of feature vectors comprises, for each of the plurality of feature vectors, generating the feature vector from the at least one of the one or more within-document uniqueness scores and the one or more cross-document uniqueness scores.

6. The method of claim 5, wherein determining the one or more within-document uniqueness scores based on the n-grams of the device name comprises determining at least one of an entropy value and an average term frequency score for the device name based on the n-grams of the device name.

7. The method of claim 5, wherein determining the one or more cross-document uniqueness scores based on the n-grams of the device name comprises determining at least one of an average inverse document frequency score and an average cosine similarity for the device name based on the n-grams of the device name and others of the plurality of documents.

8. The method of claim 1, wherein clustering the plurality of feature vectors comprises clustering the plurality of feature vectors according to a clustering algorithm.

9. The method of claim 8, wherein the clustering algorithm is k-means clustering or hierarchical clustering.

10. The method of claim 1, wherein the traffic logs were generated for Simple Network Management Protocol (SNMP) traffic or Domain Name System (DNS) traffic, wherein the plurality of device names corresponds to SNMP system names or DNS hostnames indicated in the traffic logs, and wherein the SNMP system names comprise at least one of SNMP object identifiers (OIDs) and SNMP symbolic names.

11. One or more non-transitory machine-readable media having program code stored thereon, the program code comprising instructions to:

determine, from traffic logs generated for a network, a plurality of device names of a corresponding plurality of devices of the network;

generate a plurality of feature vectors corresponding to the plurality of device names based on extraction of features from the plurality of device names;

cluster the plurality of feature vectors into a plurality of clusters with an unsupervised learning clustering algorithm;

determine whether any of the plurality of clusters correspond to a device with multiple network interface cards (NICs) based on evaluation of sizes of the plurality of clusters against a size threshold; and based on a determination that a first cluster of the plurality of clusters corresponds to a device with multiple NICs, identify one of the plurality of devices that corresponds to the first cluster and indicate that the device comprises multiple NICs.

12. The non-transitory machine-readable media of claim 11, wherein the instructions to determine whether any of the plurality of clusters correspond to a device with multiple NICs based on evaluation of the sizes against a size threshold comprise instructions to, for each cluster of the plurality of clusters, determine whether a size of the cluster is below the size threshold, and wherein the instructions to determine that the first cluster corresponds to a device with multiple NICs comprise instructions to determine that a size of the first cluster is below the size threshold.

13. The non-transitory machine-readable media of claim 11, wherein the instructions to cluster the plurality of feature vectors into the plurality of clusters with an unsupervised learning clustering algorithm comprise instructions to cluster the plurality of feature vectors into the plurality of clusters with k-means clustering or hierarchical clustering.

14. The non-transitory machine-readable media of claim 11, wherein the instructions to generate the plurality of feature vectors comprise instructions to, for each of the plurality of device names, generate n-grams of the device name;

extract a set of features from the device name based on the n-grams; and generate a feature vector comprising the set of features extracted from the device name.

15. The non-transitory machine-readable media of claim 14, wherein the instructions to extract the set of features from the device name comprise instructions to determine, based on the n-grams of the device name, at least one of one or more within-document uniqueness scores for the device name and one or more cross-document uniqueness scores for the device name.

16. An apparatus comprising:

a processor; and a machine-readable medium having instructions stored thereon that are executable by the processor to cause the apparatus to, identify a plurality of device names from traffic logs generated for a network by a plurality of devices of the network;

generate a plurality of feature vectors for the plurality of device names based on extraction of features from the plurality of device names;

cluster the plurality of feature vectors into a plurality of clusters;

determine if any of the plurality of clusters corresponds to a device with multiple network interface cards (NICs) based on evaluation of sizes of the plurality of clusters against a first criterion; and based on a determination that a first of the plurality of clusters corresponds to a device with multiple NICs, identify one of the plurality of devices that corresponds to the first cluster.

17. The apparatus of claim 16, wherein the first criterion comprises a threshold, wherein the instructions executable by the processor to cause the apparatus to determine that the first cluster corresponds to a device with multiple NICs comprise instructions executable by the processor to cause the apparatus to determine that a size of the first cluster is below the threshold.

18. The apparatus of claim 16, wherein the instructions executable by the processor to cause the apparatus to generate the plurality of feature vectors comprise instructions executable by the processor to cause the apparatus to, for each of the plurality of device names, generate n-grams of the device name;

extract a set of features from the device name based on the n-grams; and generate a feature vector comprising the set of features extracted from the device name.

19. The apparatus of claim 18, wherein the instructions executable by the processor to cause the apparatus to extract the set of features from the device name comprise instructions to determine a plurality of scores indicative of uniqueness of the device name based on the n-grams, wherein the plurality of scores comprise two or more of a term entropy value, a term frequency score, an inverse document frequency score, and a cosine similarity.

20. The apparatus of claim 16, wherein the instructions executable by the processor to cause the apparatus to identify the plurality of device names from the traffic logs comprise instructions executable by the processor to cause the apparatus to identify the plurality of device names from Simple Network Management Protocol (SNMP) traffic logs or Domain Name System (DNS) traffic logs, and wherein the plurality of device names comprise a plurality of SNMP system names or a plurality of DNS hostnames.

* * * * *